Nov. 4, 1924.  
J. W. HENRY  
1,514,045  
AGRICULTURAL MACHINE  
Filed Aug. 23, 1923  
2 Sheets-Sheet 1

WITNESSES  
INVENTOR  
J. W. Henry  
BY  
ATTORNEYS

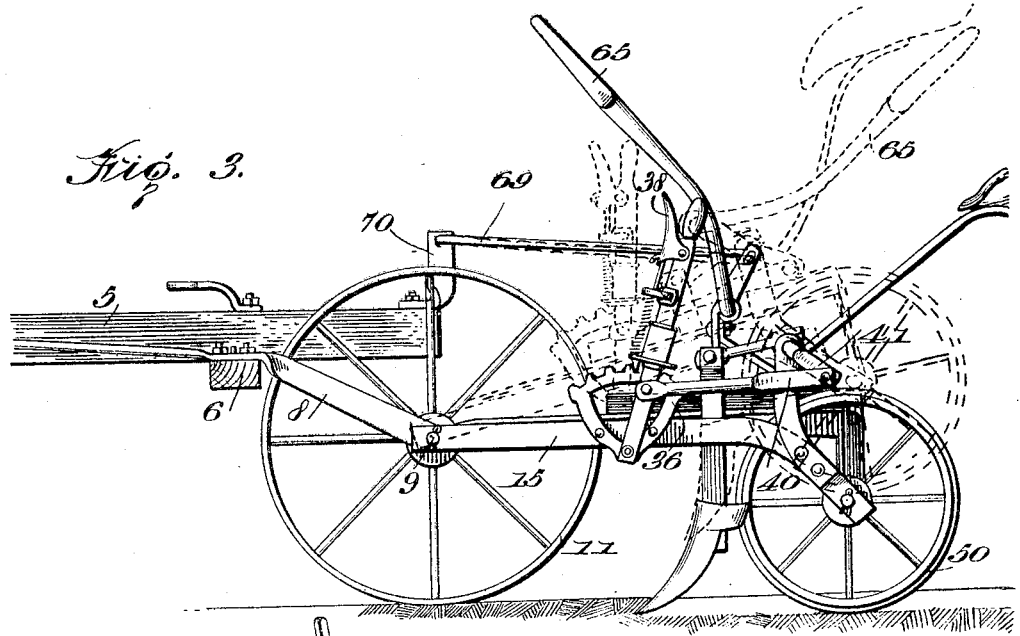

Patented Nov. 4, 1924.

1,514,045

UNITED STATES PATENT OFFICE.

JAMES W. HENRY, OF GOODING, IDAHO.

AGRICULTURAL MACHINE.

Application filed August 23, 1923. Serial No. 659,019.

*To all whom it may concern:*

Be it known that I, JAMES W. HENRY, a citizen of the United States, and a resident of Gooding, in the county of Gooding and State of Idaho, have invented certain new and useful Improvements in Agricultural Machines, of which the following is a specification.

This invention relates to agricultural machinery, and more particularly to a furrow making or ground corrugating machine.

An important object of this invention is to provide a machine of the character specified having simple means whereby the same automatically adjusts itself to inequalities in the surface being furrowed.

Further, the invention aims to provide an agricultural machine of the character specified wherein a pair of furrow making shovels are provided, and wherein means are provided for separately and independently adjusting the shovels.

Also the invention aims to provide a furrow making machine wherein the shovels and the rear wheels may be lifted off the ground to facilitate the turning of the machine at the end of the furrow.

A further object is to provide a machine of the character specified which is of highly simplified construction, durable in use, and cheap to manufacture.

Other objects and advantages of the invention will be apparent during the course of the following description.

Figure 1:
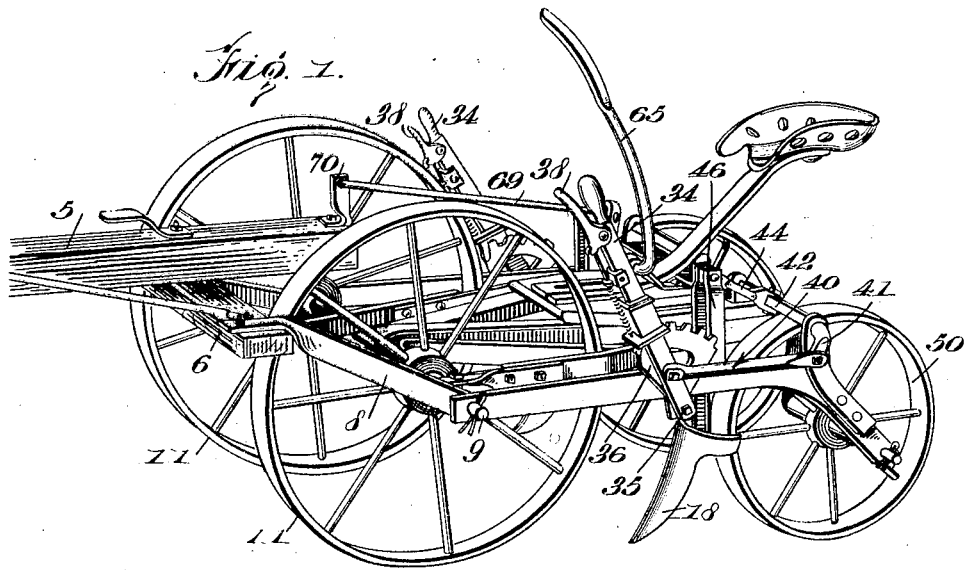
Figure 2:
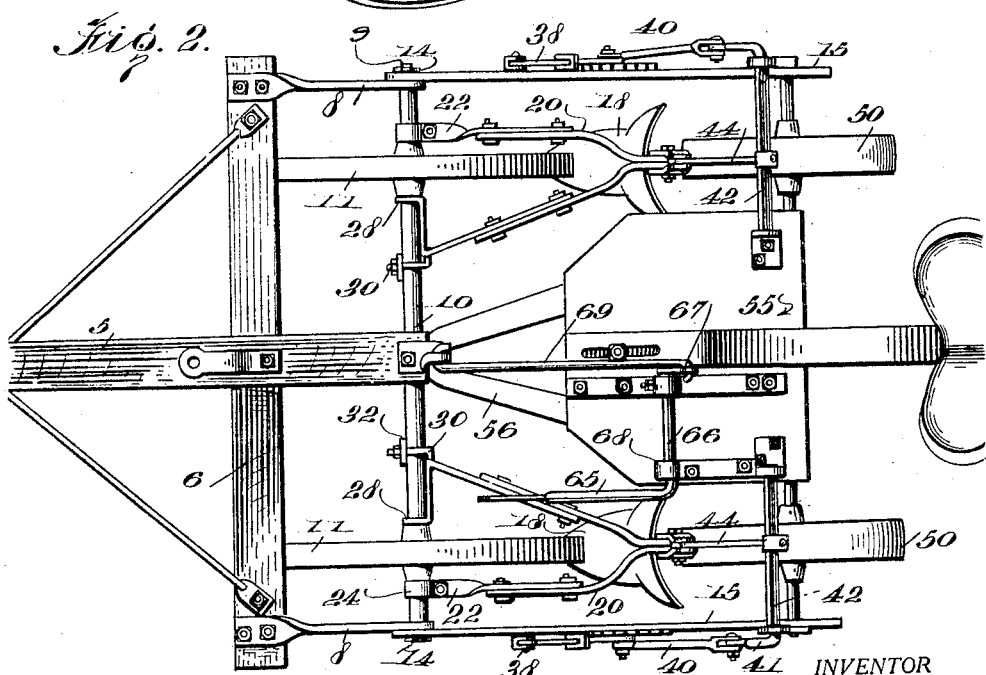

In the accompanying drawings forming a part of this application, and in which like numerals are employed to designate like parts throughout the same, Figure 1 is a perspective of the improved machine, Figure 2 is a fragmentary plan view of the same, Figure 3 is a side elevation illustrating the rear portion of the machine in its raised and lowered position, the dotted lines being employed to illustrate the rear portion of the machine in its raised position, Figure 4 is a perspective of a platform and associated elements embodied in the invention, Figure 5 is a perspective illustrating one of the shovels and a front wheel associated therewith, Figure 6 is a perspective of one of the side members embodied in the invention.

In the drawings wherein for the purpose of illustration is shown a preferred embodiment of the invention, the numeral 5 designates a tongue to which the draft animals are hitched in the usual manner. Figure 2 illustrates that the beam or tongue 5 has connection at a point spaced forwardly of its rear end with a cross beam 6 to which supporting bars 8 are securely connected. It will be seen that the supporting bars 8, of which there are two, receive the end portions 9 of a main axle and the said axle is received in a tubular member 10, upon which the front wheels 11 are mounted. Suitable fastening devices 14 are extended through the ends of the axle so as to prevent the supporting bars 8 from being displaced and also to prevent the disconnection of the side bars 15 forming a portion of the movable frame. Particular attention is invited to Figure 5 which illustrates that each shovel 18 is provided with a beam 19 extended upwardly and forwardly, and having its forward portion bifurcated to provided a pair of attaching members 20. The attaching members 20 are joined by suitable fastening devices to the attaching arms 22 arranged on opposite sides of the adjacent front wheel 11. One of the attaching arms 22 is simply rolled at its ends to provide a bearing member 24, while the other attaching arm 22 is extended inwardly or is offset as indicated at 26, and has one end apertured to provide a bearing member 28 to receive the tubular member 10. A U-shaped clamping bolt 30 is connected to one of the attaching arms 22 adjacent the offset 26 therein, and is securely connected to the tubular member 10 as indicated at 32 so as to positively prevent the disconnection of the attaching arm from the tubular member which might be said to be an axle receiving member or housing.

The connection between the beam 19 and the housing 10 permits the shovel to be adjusted about the axis of the housing and consequently the cutting depth of the shovel may me readily and conveniently varied.

The adjusting means for each shovel is entirely independent of the adjusting means for the other shovel, and consists of a lever 34 pivoted as indicated at 35 to the lower portion of a segment 36. The upper portion of the segment 36 is, as illustrated in Figures 1 and 3, provided with teeth adapted to be engaged by a locking mechanism 38 so that the lever may be held in a set position. The locking mechanism is provided with the usual dog to engage the pivot and with the usual construction, to yieldably hold the dog in position.

Figure 1 illustrates that the lever 34 is provided with a rearwardly extending link 40 pivoted to the lower portion of a crank 41, the said crank being formed at one end of a squared shaft 42. When the lever is operated the link 40 and consequently the shaft 42, will also be operated for imparting movement to a connecting link 44, joined at its forward end to the standards 46 of the shovel.

In the operation of this part of the invention, the rearward movement of the lever 34 will result in the rearward movement of the link 40, and in the turning of the shaft 42 in a counter-clockwise direction. This of course, results in the downward movement of the link 44 and in the descent of the shovel so that the cutting depth of the same is increased. When the shovels are set they will remain in this position even during the lifting of the movable frame when turning the machine. That is to say, the shovels will remain in their position with relation to the movable frame so that when the frame is again lowered the shovels will resume their former positions for furrowing or corrugating the ground.

When the machine reaches the end of a furrow it may be turned conveniently by lifting the shovels and the rear wheels upwardly. The shovels and the rear wheels 50 have connection with a movable frame which includes the side members 15, and a rear axle 54.

Attention is directed to Figure 4 which illustrates that the intermediate portion of the rear axle 54 is of U-shaped formation and has connection with a platform 55. The platform 55 is mounted upon a platform supporting frame 56 of angle iron construction and having its rear portions extended downwardly to provide attaching members 57 which are secured to the vertically extended portions of the axle 54 by U-bolts 58. The forward portion of the platform supporting frame 56 is apertured as indicated at 60 to receive the axle housing 10 as illustrated in Figure 2. However, the connection between the platform supporting frame 56 and the axle housing is such that the platform supporting frame and parts mounted thereon may be swung upwardly or downwardly without interfering with the other parts of the machine.

The movable frame which, as previously stated, includes the side members 15, the rear wheels 50, and associated parts, may be swung upwardly at the end of a furrow so that the machine may be conveniently turned, and to do this, a hand operated lever 65 is provided. The rear portion of the hand operated lever 65 is extended laterally to provide a bearing shaft 66 received in bearings 68 mounted upon the platform 55. The end of the shaft 66 is provided with a crank 67 to which a link 69 is connected. The forward portion of the link 69 is in turn connected to an ear 70 secured on the rear portion of the beam or tongue 5, and it will be seen that when the lever 65 is drawn rearwardly the crank 67 will also be turned rearwardly, and as the lever 67 cannot move rearwardly the platform 55, and in fact, the entire movable frame, will be raised. When the entire movable frame is thus elevated, the rear wheels 50 and the shovels are of course out of engagement with the ground, so that the machine can be conveniently turned in the proper direction. Suitable means may be employed for locking the lever in a set position so that the movable frame may be held above the ground during the delivery of the machine to and from the field to be cultivated.

A machine constructed in accordance with this invention is especially adapted for use in corrugating or furrowing irrigated lands, and as the wheels are in alinement with the shovels straight furrows will be produced.

Should the machine encounter a slight rise in the field the shovels will maintain their cutting depth because the movable frame may rise slightly and this, of course, will be accompanied by a slight upward movement of the shovels. Furthermore, any width furrow or corrugation may be made and the machine is especially adapted for such use as furrowing corn and potatoes and planting and cultivating various crops planted in rows.

Having thus described the invention, what is claimed is:

1. A machine of the character specified, comprising a main frame having an axle housing, a movable frame having a swinging connection with the main frame and provided with wheels, shovels carried by said movable frame and having swinging connection with said axle housing, means carried by the movable frame for raising and lowering said shovels, and means also carried by the movable frame for raising and lowering said movable frame.

2. An agricultural machine, comprising main and movable frames having overlapping side members, an axle extending through the overlapped portions of said side members, an axle housing mounted on said axle, front wheels mounted on said housing, shovels having beams straddling said wheels, means swingingly connecting said beams to said axle housing, separate cross shafts carried by said movable frame and having links connected to said beams, one end of each cross shaft being provided with a crank, a link connected to each crank, and a lever connected to each link and adapted for adjusting the cutting depth of the associated shovel.

3. An agricultural machine, comprising main and movable frames having overlapping side members, an axle extending through the overlapped portions of said side members, an axle housing mounted on said axle, front wheels mounted on said housing, shovels having beams straddling said wheels, means swingingly connecting said beams to said axle housing, separate cross shafts carried by said movable frame and having links connected to said beams, one end of each cross shaft being provided with a crank, a link connected to each crank, a lever connected to each link and adapted for adjusting the cutting depth of the associated shovel, a platform having a frame swingingly connected to said axle housing and having means supporting said cross shaft.

4. An agricultural machine, comprising main and movable frames having overlapping side members, an axle extending through the overlapped portions of said side members, an axle housing mounted on said side axle, front wheels mounted on said housing, shovels having beams straddling said wheels, means swingingly connecting said beams to said axle housing, separate cross shafts carried by said movable frame and having links connected to said beams, one end of each cross shaft being provided with a crank, a link connected to each crank, a lever connected to each link and adapted for adjusting the cutting depth of the associated shovel, a platform having a frame swingingly connected to said axle housing and having means supporting said cross shaft, a lifting lever having connection with said platform, and means establishing connection between said lifting lever and said main frame whereby the movement of said lever results in the movement of the movable frame.

5. An agricultural machine comprising main and movable frames, the main frame having a tongue and side members, an axle connected to said side members, said movable frame also being provided with side members connected to said axle, wheels mounted on said axle, a platform provided with a frame having connection with said axle, shovels having beams straddling said wheels, attaching arms connected to said beams on opposite sides of said wheels, and surrounding said axle, a cross shaft connected to said platform and having links, standards connected to said shovels and having connection with said links, separate levers connected to said cross shafts, and means whereby to hold said levers and consequently said shovels in set positions.

6. An agricultural machine comprising main and movable frames, the main frame having a tongue and side members, an axle connected to said side members, said movable frame also being provided with side members connected to said axle, wheels mounted on said axle, a platform provided with a frame having connection with said axle, shovels having beams straddling said wheels, attaching arms connected to said beams on opposite sides of said wheels, and surrounding said axle, a cross shaft connected to said platform and having links, standards connected to said shovels and having connection with said links, separate levers connected to said cross shafts, means whereby to hold said levers and consequently said shovels in set positions, a lifting lever having connection with said platform and provided with a crank, and a link connecting the said crank to said tongue, whereby the movement of said lifting lever in a predetermined position results in the movement of said movable frame and said shovels upwardly.

7. An agricultural machine comprising main and movable frames, the main frame having a tongue and side members, an axle connected to said members, said movable frame also being provided with side members connected to said axle, wheels mounted on said axle, a platform provided with a frame having connection with said axle, shovels having beams straddling said wheels, attaching arms connected to said beams on opposite sides of said wheels, and surrounding said axle, a cross shaft connected to said platform and having links, standards connected to said shovels and having connection with said links, separate levers connected to said cross shafts, means whereby to hold said levers and consequently said shovels in set positions, a lifting lever having connection with said platform and provided with a crank, a link connecting the said crank to said tongue, whereby the movement of said lifting lever in a predetermined position results in the movement of said movable frame and said shovels upwardly, and rear wheels in alinement with the first named wheels and said shovels, and having an axle connected to said platform.

JAMES W. HENRY.